United States Patent
Wee et al.

(10) Patent No.: US 11,747,886 B2
(45) Date of Patent: Sep. 5, 2023

(54) RESPONSE MECHANISMS OF A POWER SOURCING EQUIPMENT TO A SWAP EVENT OF A POWER SUPPLY UNIT

(71) Applicant: HEWLETT PACKARD ENTERPRISE DEVELOPMENT LP, Houston, TX (US)

(72) Inventors: Hong Yi Wee, Singapore (SG); Kah Hoe Ng, Singapore (SG); Shiyu Tian, Singapore (SG)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/591,376

(22) Filed: Feb. 2, 2022

(65) Prior Publication Data

US 2023/0244295 A1 Aug. 3, 2023

(51) Int. Cl.
*G06F 1/32* (2019.01)
*G06F 1/3287* (2019.01)
*G06F 1/3296* (2019.01)
*G06F 1/3206* (2019.01)

(52) U.S. Cl.
CPC .......... *G06F 1/3287* (2013.01); *G06F 1/3206* (2013.01); *G06F 1/3296* (2013.01)

(58) Field of Classification Search
CPC ..... G06F 1/3287; G06F 1/3206; G06F 1/3296
See application file for complete search history.

(56) References Cited

U.S. PATENT DOCUMENTS

| | | | |
|---|---|---|---|
| 7,478,251 B1 * | 1/2009 | Diab | G06F 1/3209 713/340 |
| 9,146,613 B2 | 9/2015 | Hamdi et al. | |
| 9,281,717 B2 | 3/2016 | Bailey et al. | |
| 9,385,668 B2 | 7/2016 | Blair et al. | |
| 9,979,627 B2 | 5/2018 | Shetty et al. | |
| 9,990,020 B2 | 6/2018 | Jain et al. | |
| 10,241,554 B2 | 3/2019 | Ragupathi et al. | |
| 10,725,519 B1 | 7/2020 | Misra et al. | |
| 2008/0052546 A1 * | 2/2008 | Schindler | H04L 12/40045 713/300 |
| 2009/0083552 A1 * | 3/2009 | Hussain | H04L 12/10 713/300 |
| 2016/0320818 A1 | 11/2016 | Huang et al. | |
| 2019/0052538 A1 | 2/2019 | Shih et al. | |

FOREIGN PATENT DOCUMENTS

WO WO-2016060781 A1 4/2016

* cited by examiner

*Primary Examiner* — Stefan Stoynov
(74) *Attorney, Agent, or Firm* — Hewlett Packard Enterprise Patent Department (57) ABSTRACT

Example implementations relate to a power sourcing equipment (PSE), and a method of reallocating power to one or more powered devices (PDs) by the PSE, before a swap event of a power supply unit (PSU). The method includes receiving an information about the swap event, determining based on the information that the swap event is expected to cause powering down of the one or more PDs, and requesting a first PD among the one or more PDs to permit the PSE to reduce an initial value of power allocated to the first PD. Further, the method includes reducing an amount of power to the first PD from the initial value to a reduced value of power based on a response from the first PD, and reallocating the reduced value of the power to the first PD to avoid powering down of the one or more PDs during the swap event.

20 Claims, 5 Drawing Sheets

RESPONSE MECHANISMS OF A POWER SOURCING EQUIPMENT TO A SWAP EVENT OF A POWER SUPPLY UNIT

BACKGROUND

Power over Ethernet (PoE) allows an Ethernet cable to be used for both power transmission and data transmission. Powered devices (PDs), such as Voice over Internet Protocol (VoIP) phones, Light-Emitting Diode (LED) lights, Internet Protocol (IP) cameras, wireless access points (APs), Bluetooth Low-Energy (BLE) beacons, or the like may be powered by PoE, and may therefore be installed in locations where it would be impractical or expensive to install wires to provide power.

A number of industry standards exist for providing PoE to the powered devices. For example, the Institute of Electrical and Electronics Engineers (IEEE) has defined at least three industry standards: i) IEEE 802.3af that allows up to 15.4 Watts to be delivered over Category 5 (Cat5) Ethernet cables; ii) IEEE 802.3at that allows up to 30 Watts to be delivered over Cat5 cables; and iii) IEEE 802.3bt that allows up to 71.3 Watts to be delivered over Cat5 cables. Further, LTPoE++ is a proprietary standard which allows up to 90 Watts to be delivered over Cat5 cables. In the IEEE standards, a device that receives PoE is called a Powered Device (PD), while a device that provides PoE is called a Power Sourcing Equipment (PSE).

BRIEF DESCRIPTION OF THE DRAWINGS

Various examples will be described below with reference to the following figures.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening element, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

For purposes of explanation, certain examples are described with reference to the components illustrated in FIGS. 1-5. The functionality of the illustrated components may overlap, however, and may be present in a fewer or greater number of elements and components. Moreover, the disclosed examples may be implemented in various environments and are not limited to the illustrated examples. Further, the sequence of operations described in connection with FIG. 5 is an example and is not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. Such modifications and variations are intended to be included within the scope of this disclosure and protected by the following claims.

Computing environments use networks, such as enterprise networks, datacenter networks, or other types of networks to support a wide variety of industries, institutions, etc. Increasingly, many of these networks include networking devices, such as network switches or network routers, which operate uninterruptedly to ensure that workloads deployed in computing environments are continuously available. Typically, each network switch includes conduits, such as Ethernet cables, to not only provide electronic communications, but also to provide power to each electronic device, e.g., each powered device (PD) connected to the network switch via a respective Ethernet cable. Lapses in providing power (i.e., Power over Ethernet (PoE)) for certain types of PDs may prove costly for such industries or institutions. Therefore, various industries and institutions, such as businesses, universities, governments, hospitals, or the like that use such networks often value reliability highly.

To facilitate increased reliability, the network switch (or a chassis having multiple network switches) is configured to receive power from multiple power supply units (PSUs) at a time. This redundancy of PSUs may prevent the network switch from shutting down entirely when a PSU among the multiple PSUs is swapped with a new PSU during a maintenance or service event of the PSU. Thus, the redundancy of the PSUs in the computing environment, may prevent a time-consuming reboot of the network switch. As used herein, the term "swap" may refer to a replacement of an old device with a new device, which may occur during a periodic maintenance or service event, for example.

The periodic swapping of the PSU with the new PSU may be required to reduce the failure of the PSUs due to prolonged and continuous usage of the PSUs over a period of time. In general, the PSU may fail due to a hardware failure, overheating, a failure of an electrical outlet into which the PSU is plugged, etc. Accordingly, such periodic swapping of the PSU may reduce PSU failure and an associated downtime of the computing environment which may have occurred otherwise due to the failure of the PSU.

However, during a swapping event, the amount of power flowing into the network switch is reduced. As a result, the amount of power that the network switch is able to provide to the PDs via the respective Ethernet cable may also be reduced. In other words, when the PSU supplying power to the network switch is swapped, the network switch may be obliged to stop providing PoE to a subset of the PDs that are connected to the network switch, in order to conserve power. For example, some ports on the network switch, which are designated as high priority ports, may continue providing PoE to the PDs connected thereto during a PSU swap event. However, some other ports on the network switch that are designated as low priority ports may be obliged to stop providing PoE to the PDs connected thereto during the PSU swap event. Thus, the PDs that are connected to the low priority ports may have to wait until the swap event of the PSU is completed to receive PoE again. It may be noted that the PDs that are connected to the high priority ports are known as high priority PDs and the PDs that are connected to the low priority ports are known as low priority PDs. Accordingly, some of the low priority PDs that are backed up by batteries may be able to postpone shutting down for a short period of time, but may be obliged to shut down if PoE does not become available again within the short period of time. If such PDs do shut down, the reboot process of such PDs may cause a further delay after the swap event is completed.

Further, the PD's use a Link Layer Discovery Protocol (LLDP) protocol to exchange a series of communications, such as one-way communications with the PSE. In particular, the current LLDP protocol supports a PD to simply request for power from a PSE, and the PSE can choose whether to comply by providing the requested amount of power. Moreover, the current LLDP protocol provides no way for a PSE to request that a PD accept a lower power allocation after the initial allocation of power to the PD. Thus, under the constraints of existing LLDP protocol-based systems, there would be no way for the PSE to request that the one or more PDs accept a lower amount of power allocation in response to the swap event of the PSU so that the PSE could reallocate a reduced amount of the power to one or more PDs. As a result, the potential capacity to keep powering the one or more PDs during the swap event of the first PSU 132 is diminished.

Systems and methods described herein provide a way for a power sourcing equipment (PSE), for example, a network switch, to continue providing some amount of power (or PoE) to one or more PDs that are connected to low priority ports during a swap event of a PSU among a plurality of PSUs until the swap event is completed. For example, before the swap event has started, the PSE may reduce an amount of power from an initial value of power allocated to the one or more PDs connected to the low priority ports to a reduced power value. Further, the PSE may reallocate and provide a reduced amount of power to the one or more PDs in order to avoid powering down of the one or more PDs during the swap event of the PSU. As described in further detail below, the PSE, upon receipt of information about the swap event of the PSU, can communicate to the one or more low priority PDs (and/or to the one or more high priority PDs) to notify those PDs that the PSU swap event is expected to occur. Accordingly, the PSE can negotiate with those low priority PDs first (and optionally with the high priority PDs later) to reduce some amount of power from the initial value of power that has been allocated to, but is not being completely used by, each of those one or more low priority PDs. Hence, the reduced value of power from those one or more low priority PDs can be used to offset the power deficit which might occur during the swap event of the PSU. This may avoid the need to power down of the one or more low priority PDs during the swap event of the PSU. Accordingly, the PSE may uninterruptedly provide power to the plurality of PDs during the swap event of the PSU without powering down the one or more low priority PDs, thus avoiding the downtime and/or reboot time of the one or more low priority PDs after the swap event.

Accordingly, the present disclosure describes example implementations of a power sourcing equipment (PSE), and an associated method for reallocation of power (or Power over Ethernet (PoE)) to one or more powered devices (PDs) connected to the PSE, before a swap event of a power supply unit (PSU) among a plurality of PSUs. Thus, the PSE may be able to prevent powering down of the one or more PDs during the swap event. In some examples, the method includes receiving an information about the swap event of the PSU among the plurality of PSUs connected to the PSE. The method further includes determining based on the information that the swap event is expected to cause powering down of the one or more PDs based on a priority of the plurality of PDs. Further, the method includes requesting a first PD among the one or more PDs to permit the PSE to reduce the initial value of power allocated to the first PD. The method further includes reducing an amount of power to the first PD from the initial value of power allocated to the first PD to a reduced value of power based on a response from the first PD to the request from the PSE for reducing the power. Further, the method includes reallocating and providing the reduced value of power to the first PD to avoid powering down of the one or more PDs during the swap event.

Figure 1:
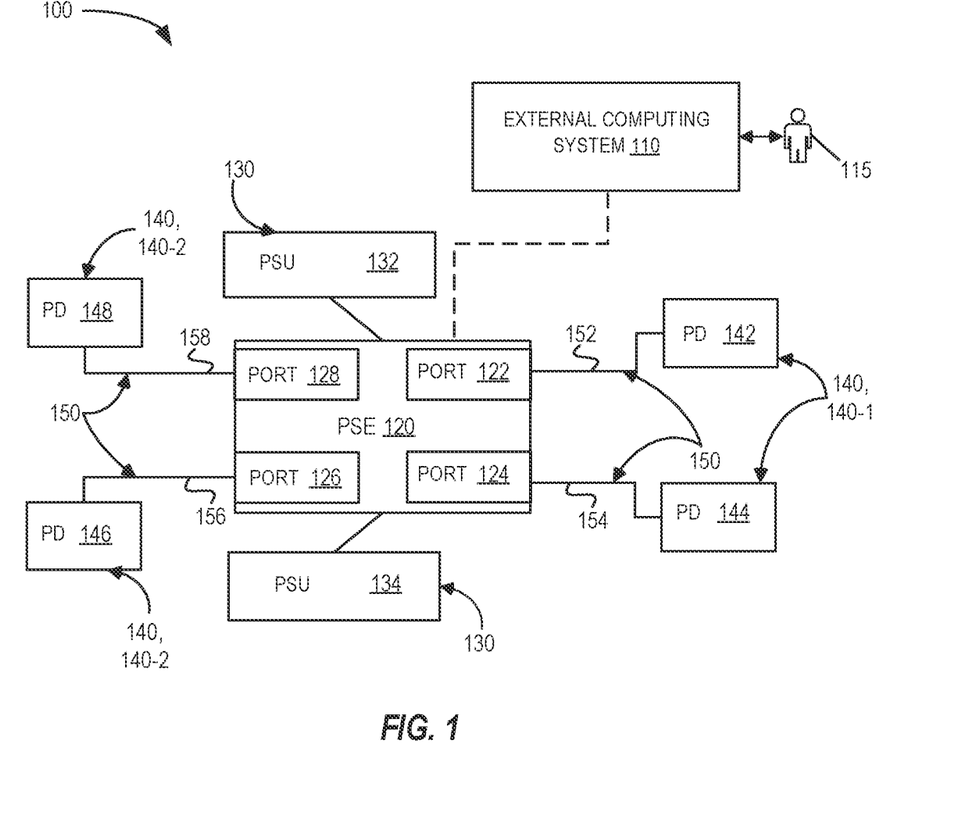
FIG. 1 illustrates a portion of an example computing environment having a power sourcing equipment, in accordance to an example implementation of the present disclosure.

FIG. 1 depicts a portion of a computing environment 100, such as a production environment hosted in a datacenter. In general, the computing environment 100 uses networks, such as enterprise networks, datacenter networks, or other types of networks to support a wide variety of industries, and executes one or more workloads to deliver intended services to customers belonging to such wide variety of industries. In one or more examples, the computing environment 100 may be managed via an external computing system 110. For example, an administrator 115 may access networking devices, such as a power sourcing equipment (PSE) 120, and electronic devices, such as a plurality of powered devices (PDs) 140, via the external computing system 110 to view/ track operations of those devices, and further apply various actions on those devices to enable the computing environment 100 to operate uninterruptedly.

As shown in the example of FIG. 1, the computing environment 100 includes the PSE 120, a plurality of power supply units (PSUs) 130, and the plurality of PDs 140. The PSE 120 may be communicatively connected to the external computing system 110 over a TCP/IP (Transmission Control Protocol/Internet Protocol) network (not labeled), or the like without deviating from the scope of the present disclosure. Further, the PSE 120 is connected to the plurality of PSUs 130 via power cables (not labeled), and to the plurality of PDs 140 via a plurality of Ethernet cables 150.

In some examples, the PSE 120 may refer to a kind of networking equipment (or device), which is responsible for transmitting power (e.g., Power over Ethernet (PoE)) and transceiving data to connected devices. In some non-limiting examples, the PSE 120 may be a network switch, a multi-slot chassis containing multiple network switches, a router, or the like. In certain examples, the network switch is commonly called an endspan device (as per Institute of Electrical and Electronics Engineers (IEEE) 802.3af), or an intermediary device disposed between a non-PoE-capable switch and a PoE device, or an external PoE injector called a mid-span device. In one or more examples, the PSE 120 includes a plurality of ports 122, 124, 126, 128, for example, a plurality of Ethernet ports, where each Ethernet port may be compatible for receiving an Ethernet jack of the corresponding Ethernet cable of the plurality of Ethernet cables 150.

In some examples, the plurality of PSUs 130 may be connected to a main power source of the datacenter for receiving main alternating current (AC) power, convert the main AC power to direct current (DC) power, and transmit the DC power to the PSE 120. In some examples, the plurality of PDs 140 may refer to a kind of electronic device, which is connected to the PSE 120 via the respective Ethernet cable of the plurality of Ethernet cables 150. In such examples, each of the plurality of PDs 140 may receive power from the PSE 120 and transceive data with the PSE 120 via the respective Ethernet cable of the plurality of Ethernet cables 150. In some non-limiting examples, the plurality of PDs 140 may be Voice over Internet Protocol (VoIP) phones, Light-Emitting Diode (LED) lights, Internet Protocol (IP) cameras, wireless Access Points (APs), Bluetooth Low-Energy (BLE) beacons, or the like.

Persons of skill in the art will understand that the PSE 120 and each of the plurality of PDs 140 may include a processing resource and machine-readable medium (e.g., memory) to facilitate the execution of the functionality described herein. In some examples, the processing resource may be a physical processor. In some examples, the physical processor may be at least one of a central processing unit (CPU), a microprocessor, and/or other hardware devices suitable for performing the functionality described herein. In some examples, the machine-readable medium is non-transitory and is alternatively referred to as a non-transitory machine-readable medium.

As shown in FIG. 1, the PSE 120 includes a first port 122, a second port 124, a third port 126, and a fourth port 128. Within the PSE 120, each of the plurality of ports 122, 124, 126, 128 may be assigned a priority value (e.g., a Spanning Tree Port Priority value). In some examples, each of the first port 122 and the second port 124 is assigned a low priority value, and hence each of the first port 122 and the second port 124 is categorized as a low priority port. Similarly, in some examples, each of the third port 126 and the fourth port 128 is assigned a high priority value, and hence each of the third port 126 and the fourth port 128 is categorized as a high priority port. Further, as shown in FIG. 1, the plurality of PSUs 130 includes a first PSU 132 and a second PSU 134 both connected to the PSE 120 via cables for supplying power to the PSE 120. In some examples, the first PSU 132 may have a first power supply rating and a second PSU 134 may have a second power supply rating. As shown in FIG. 1, the plurality of PDs 140 includes a first PD 142, a second PD 144, a third PD 146, and a fourth PD 148. In some examples, the first and second PDs 142, 144 respectively, may be referred to as a low priority PDs 140-1, whereas the third and fourth PDs 146, 148 respectively, may be referred to as a high priority PDs 140-2. In such examples, the first PD 142 is connected to the first port 122 via a first Ethernet cable 152, and the second PD 144 is connected to the second port 124 via a second Ethernet cable 154. Similarly, the third PD 146 is connected to the third port 126 via a third Ethernet cable 156, and the fourth PD 148 is connected to the fourth port 128 via a fourth Ethernet cable 158. In some examples, each of the plurality of Ethernet cables 150 may be a Cat5 cable.

In some examples, the PSE 120 may receive about 680 Watts to 1600 Watts of rated power from the plurality of PSUs 130. In such examples, the PSE 120 may supply about 370 Watts to 1440 Watts of PoE to the plurality of PDs 140. In some non-limiting examples, the computing environment 100 may include two PSEs 120 and forty-eight PDs 140. In such examples, each PSE may receive about 1600 Watts of rated power from the plurality of PSUs 130, and may supply about 60 Watts of PoE to each of the plurality of PDs 140.

During operation, each of the plurality of PSUs 130 supplies power to the PSE 120 via the respective cable. Accordingly, the PSE 120 may transceive data, and transmit power to the plurality of PDs 140 via the plurality of Ethernet cables 150. In such examples, when each of the plurality of PDs 140 is initially connected to the PSE 120 by the respective Ethernet cable of the plurality of Ethernet cables 150, each of the plurality of PDs 140 and the PSE 120 may exchange a series of communications that conform to the Link Layer Discovery Protocol (LLDP). The LLDP is a vendor-neutral link layer protocol used by network devices to communicate information such as device identities, device capabilities, port names and descriptions, medium access control (MAC) and Physical (PHY) layer information, and medium dependent interface (MDI) information.

In one or more examples, through such series of LLDP communications, each of the plurality of PDs 140 may request that the PSE 120 supply power over Ethernet (PoE) to the respective PD of the plurality of PDs 140. In some examples, each of the plurality of PDs 140 may request power based on an actual power requirement and a margin power requirement of the respective PD. In some examples, the term "actual power requirement" may refer to an absolute power that the PD may consume while handling a normal workload. Further, the term "margin power requirement" may refer to a buffer power that the PD may additionally require to handle an additional workload (or overload). The PSE 120 may elect to comply with the request or reject the request. The PSE 120 may reject the request for power allocation from each of the plurality of PDs 140 if a total power requested from the plurality of PDs 140 exceeds a total power supply rating of the plurality of PSUs 130 connected to the PSE 120, for example. Similarly, the PSE 120 may accept the request for power allocation from each of the plurality of PDs 140 if the total power requested from the plurality of PDs 140 does not exceed the total power supply rating of the plurality of PSUs 130 connected to the PSE 120, for example. In such examples, if the PSE 120 complies, the PSE 120 allocates an initial value (amount) of power to each of the plurality of PDs 140 (e.g., up to 90 Watts to each of the high priority PDs 140-2, and 60 Watts to each of the low priority PDs 140-1, if each of the plurality of Ethernet cables 150 is a Cat5 cable) and provides the allocated initial value of power to the respective PD of the plurality of PDs 140.

At times, the administrator 115 may send a command to the PSE 120 via the external computing system 110, about a swap event of at least one PSU, for example, a first PSU 132 among the plurality of PSUs 130. In some examples, the command may specify an approximate initiation time of the swap event, which may be a useful time window for the PSE 120 to negotiate, reduce, reallocate, and provide the power to each of the plurality of PDs 140. In such examples, such command from the external computing system 110 may trigger a rapid power-down (RPD) signal or a multi-priority rapid power-down (MPRPD) signal within the PSE 120.

In some examples, upon generation of such RPD or MPRPD signal (i.e., before the swap event), the PSE 120 may determine that the swap event of the first PSU 132 is expected to cause powering down of one or more powered devices (PDs) among a plurality of PDs 140 connected to the PSE 120. For example, the PSE 120 may calculate a power supply rating of remaining PSUs among the plurality of PSUs 130 and compare it with the total power requirement of the plurality of PDs 140 to determine whether the swapping event of the first PSU 132 results in a power deficit to continue providing the initial value of power allocated to the plurality of PDs 140. For example, if the amount of power that the second PSU 134 (i.e., the remaining PSU) provides to the PSE 120 during the swap event of the first PSU 132 is sufficient for the PSE 120 to continue providing the initial amount of power allocated to each of the plurality of PDs 140, then the PSE 120 may not communicate and/or negotiate with any of the plurality of PDs 140 for reducing and/or reallocating the power. Alternatively, if the amount of power that the second PSU 134 provides to the PSE 120 during the swap event of the first PSU 132 is insufficient for the PSE 120 to continue providing the initial amount of power allocated to the plurality of PDs 140, then the PSE 120 may react to the RPD or MPRPD signal by sending a first network communication to the plurality of PDs 140 indicating that the swap event of the first PSU 132 is about to occur and negotiate with one or more PDs of the plurality of PDs 140 based on a priority of the plurality of PDs 140 for reducing and/or reallocating the power.

For example, the PSE 120 may first negotiate with one or more PDs among the low priority PDs 140-1 (i.e., based on a lower priority of the plurality of PDs 140), and later optionally with one or more PDs among the high priority PDs 140-2 (i.e., based on the higher priority of the plurality of PDs 140), to reduce an amount of power from the one or more PDs among the low priority PDs 140-1 or the high priority PDs 140-2. Accordingly, the PSE 120 may try to avoid powering down of the one or more PDs among the plurality of PDs 140 during the swap event of the first PSU 132.

In the current LLDP protocol, a PD simply requests power from a PSE, and the PSE can choose whether to comply by providing the requested amount of power. Similarly, the current LLDP protocol provides no way for a PSE to request that a PD accept a lower power allocation after the initial allocation of power to the PD. Thus, under the constraints of existing LLDP protocol-based systems, there would be no way for the PSE 120 to request that the one or more PDs among the plurality PDs 140 accept a lower amount of power allocation in response to the swap event of the first PSU 132 so that the PSE 120 could reallocate a reduced amount of the power to one or more PDs among the low priority PDs 140-1. As a result, the potential capacity to keep powering the one or more PDs among the plurality of PDs 140 during the swap event of the first PSU 132 is diminished.

Using the systems and methods described herein, before the swap event of the first PSU 132, the PSE 120 can request that the first PD 142 accept a lower amount of power than was initially allocated by sending a first network communication. The first PD 142 may opt to continue operating in a normal mode or switch to a power-saving mode based on the request from the PSE 120, and may send a second network communication to the PSE 120. In some examples, the first and second network communications are performed based on the LLDP protocol. Accordingly, the PSE 120 can reduce the amount of power allocated to the first PD 142 to a reduced value of power. Further, the PSE 120 may determine whether an amount of power reduced from the first PD 142 is sufficient to offset the deficit of the power due the swap event of the first PSU 132. If the PSE 120 determines that the amount of power reduced from the first PD 142 is insufficient to offset the deficit of the power due to the swap event of the first PSU 132, then the PSE 120 may further negotiate with the second PD 144 to accept a lower amount of power than was initially allocated to the second PD 144. Similarly, the second PD 144 may opt to continue operating in the normal mode or switch to the power-saving mode based on the request from the PSE 120. Accordingly, the PSE 120 can reduce the amount of power allocated to the second PD 144 to the reduced value of power. Further, the PSE 120 may determine whether the amount of power reduced from the second PD 142 is sufficient to offset the remaining power deficit due to the swap event of the first PSU 132. Accordingly, if the PSE 120 determines that the amount of power reduced from the second PD 144 is sufficient to offset the remaining power deficit due to the swap event of the first PSU 132, then the PSE 120 may stop negotiating with any other PD among the plurality of PDs 140 and allocate a respective reduced amount of power to each of the first and second PDs 142, 144. Once the reallocation is complete, the PSE 120 provides the respective reduced amount of power to each of the first and second PDs 142, 144 via respective first and second ports 122, 124 and respective first and second Ethernet cables 152, 154. In this manner, the PSE 120 may be able to re-negotiate the amount of power allocated to the first and second PDs 142, 144 (i.e., low priority PDs 140-1) so that both the first and second PDs 142, 144 may be powered during the swap event of the first PSU 132.

In some examples, to facilitate this re-negotiation of the amount of power allocated to the first PD 142 and/or to the second PD 144, an additional Type-Length-Value (TLV) can be added to the LLDP protocol. The additional TLV can include at least one bit that serves as a PSU swap status. The bit may include two values, for example, a first value of the bit and a second value of the bit. In one or more examples, the first value of the bit may function as a swap status indicator of the first PSU 132 and the second value of the bit may function as the swap status indicator of the second PSU 134. Each of the first value of the bit and the second value of the bit may either have "zero value" or "one value". In some examples, the one value may represent that the swap event of the PSU is about of occur and the zero value may represent that the swap event of the PSU is not occurring. In some examples, the first value of the bit having the one value may indicate that the PSU swap event for the first PSU 132 is about to occur, while a second value of the bit having the zero value may indicate that the PSU swap event for the second PSU 134 is not occurring. The additional TLV may also include one or more bits that indicate whether the first PD 142, for example, has opted to switch to the power-saving mode or continue to operate in the normal mode, based on the request from the PSE 120. Furthermore, the additional TLV may include a plurality of bits that indicate how much power (e.g., minimum power) the first PD 142 may have to receive from the PSE 120 in order to operate in the power-saving mode or the amount of power (i.e., maximum power) that the first PD 142 may expect to consume while operating in the power-saving mode. Also, the TLV may include a plurality of bits that indicate an amount of power (i.e., maximum power) that the first PD 142 may expect to consume while operating in the normal mode or how much power (e.g., minimum power) that the first PD 142 may have to receive from the PSE 120 in order to operate in the normal mode.

The additional TLV allows the PSE 120 to have multiple options while negotiating with the first PD 142 to reduce the amount of power initially allocated to the plurality of PDs 140. For example, if the first PD 142 has opted to switch to the power-saving mode, the PSE 120 can reduce the amount of power initially allocated to the first PD 142 to an amount that the additional TLV indicates that the first PD 142 must receive in order to operate in the power-saving mode. Once the PSE 120 updates the reduced amount of power allocated to the first PD 142, the PSE 120 can check whether the amount of power reduced from the first PD 142 is sufficient to offset the deficit of power due to the swap event of the first PSU 132. If the amount of power reduced from the first PD 142 among the one or more PDs in the low priority PDs 140-1 is sufficient, then the PSE 120 may not negotiate with any other PDs among the plurality of PDs 140. However, if the amount of power reduced from the first PD 142 is insufficient to offset the deficit of power due to the swap event of the first PSU 132, then the PSE 120 may repeat the aforementioned steps for the second PD 144 among the one or more PDs in the low priority PDs 140-1.

On the other hand, if the first PD 142 has opted to continue operating in the normal mode (i.e., unwilling to switch to the power-saving mode), then the PSE 120 can reduce the initial value of power allocated to the first PD 142 to a maximum amount that the first PD 142 is expected to consume, for example, the actual power requirement of the first PD 142. Once the PSE 120 updates the amount of power allocated to the first PD 142, the PSE 120 can check whether the amount of power reduced from the first PD 142 is sufficient to offset the deficit of power due to the swap event of the first PSU 132. If the amount of power reduced from the first PD 142 among the one or more PDs in the low priority PDs 140-1 is sufficient, then the PSE 120 may not negotiate with any other PDs among the plurality of PDs 140. However, if the amount of power reduced from the first PD 142 is insufficient to offset the deficit of power due to the swap event of the first PSU 132, then the PSE 120 may repeat the aforementioned steps for the second PD 144 among the one or more low priority PDs 140-1.

In some examples, after reallocating and providing the reduced value of power to the first and second PDs 142, 144 among the one or more PDs in the low priority PDs 140-1, the PSE 120 may initiate a pre-determined time period for completing the swap event from the administrator 115. The PSE 120 may communicate the pre-determined time period to the administrator 115 via the external computing system 110. In some examples, after the swap event of the first PSU 132 is completed with a swapped PSU, the PSE 120 may be notified about the completion of the swap event. In some other examples, after the completion of the swap event of the first PSU 132 with the swapped PSU, the PSE 120 may receive additional power and may automatically be notified about the completion of the swap event.

In some examples, the PSE 120 may determine whether the swap event is completed within the pre-determined time period. If the swap event has been completed within the pre-determined time period, then the PSE 120 may further determine a power supply rating of a swapped PSU. Accordingly, the PSE may determine whether the swapped PSU has the power supply rating greater than or equal to an old power supply rating of the first PSU 132 (or an older PSU). In some examples, if the PSE 120 determines that the power supply rating of the swapped PSU is greater than or equal to the first power supply rating of the first PSU 132, then the PSE 120 may restore the initial value of power allocated to each of the plurality of PDs 140. In some other examples, if the PSE 120 determines that the power supply rating of the swapped PSU is less than the first power supply rating of the first PSU 132, then the PSE 120 may communicate to the external computing system 110 about powering down the one or more PDs in the low priority PDs 140-1 based on the priority for accommodating the power supply rating of the swapped PSU. In some examples, the term "accommodating" the power supply rating of the swapped PSU may refer to using the power provided from the swapped PSU to supply PoE to remaining PDs (i.e., non-powered down PDs) among the plurality of PDs 140.

In some other examples, when the PSE 120 determines that the swap event is not completed within the pre-determined time period, then the PSE 120 may restore the initial value of power allocated to each of the plurality of PDs 140. In other words, in response to non-completion of the swap event within the pre-determined time period, the PSE 120 may restore the initial value of power allocated to each PD among the plurality of PDs 140.

A non-limiting example implementation of the swap event is discussed herein. In some examples, the first power supply rating of the first PSU 132 may be around 60 Watts and the second power supply rating of the second PSU 134 may be around 240 Watts. Similarly, each of the first and second PDs 142, 144 respectively, may have a power requirement of about 60 Watts. Further, each of the third and fourth PDs 146, 148 respectively, may have a power requirement of about 90 Watts. In such examples, the PSE 120 may receive a total power of about 300 Watts and the PSE 120 may have to transmit about 300 Watts of power to the plurality of PDs 140. In some examples, when the first PSU 132 is expected to undergo a swap event, the PSE 120 may expect a power deficit of about 60 Watts. Therefore, the PSE 120 may be able to transmit about 240 Watts to the plurality of PDs 140. In such examples, the PSE 120 may first negotiate with the first PD 142 among the one or more PDs in the low priority PDs 140-1 based on the priority value of the plurality of PDs 140. If the first PD 142 has opted to switch to the power-saving mode, then the first PD 142 may indicate how much power it has to receive in order to operate in the power-saving mode. In some examples, the first PD 142 may indicate about 10 Watts as the amount of power that the first PD 142 is expected to consume while operating in the power-saving mode. In that case, the PSE 120 may reduce about 50 Watts (i.e., the difference between the initial allocated power of 60 Watts and the 10 Watts maximum expected to be consumed during power-saving mode) from the first PD 142 and re-allocate 10 Watts to the first PD 142. Further, the PSE 120 may compare the amount of power reduced from the first PD 142 with the power deficit due to the swap event of the first PSU 132. For example, the PSE 120 may determine that the deficit is still about 10 Watts. In such examples, the PSE 120 may further negotiate with the second PD 144 among the one or more PDs in the low priority PDs 140-1 based on the priority value of the plurality of PDs 140. If the second PD 142 has opted (or is only willing) to operate in the normal mode, then the second PD 144 may indicate how much maximum amount of power that the second PD 144 is expected to consume while operating in the normal mode. In some examples, the second PD 144 may indicate about 50 Watts as the maximum amount of power that the second PD 144 is expected to consume while operating in the normal mode (or how much minimum amount of power that the second PD 144 has to receive from the PSE 120 in order to operate in the normal mode). In such a case, the PSE 120 may reduce about 10 Watts (i.e., the difference between the initial allocated power of 60 Watts and the 50 Watts expected to be consumed) from the second PD 144 and re-allocate 50 Watts to the second PD 144. Further, the PSE 120 may compare the reduced value of power from the second PD 144 with the remaining power deficit due to the swap event of the first PSU 132. For example, the PSE 120 may determine that the remaining power deficit is 0 Watts. In such examples, the PSE 120 may not negotiate with any other PDs among the plurality of PDs 140. Accordingly, the PSE 120 may reallocate the reduced value of power to the first and second PDs 142, 144 respectively, provide the corresponding reduced value of power to the first and second PDs 142, 144 respectively, and communicate to the external computing system 110 to initiate the swap event.

Another non-limiting example implementation of the swap event is discussed herein. In some other examples, the first power supply rating of the first PSU 132 may be around 60 Watts, and the second power supply rating of the second PSU 134 may be around 240 Watts. Similarly, each of the first and second PDs 142, 144 respectively, may have a power requirement of about 60 Watts. Further, each of the third and fourth PDs 146, 148 respectively, may have a power requirement of about 90 Watts. In such examples, the PSE 120 may receive a total power of about 300 Watts, and the PSE 120 may have to transmit about 300 Watts of power to the plurality of PDs 140. In some examples, when the first PSU 132 is expected to undergo the swap event, the PSE 120 may expect a power deficit of about 60 Watts. Therefore, the PSE 120 may be able to transmit about 240 Watts to the plurality of PDs 140. In such examples, the PSE 120 may negotiate with the first PD 142 among the one or more PDs in the low priority PDs 140-1 based on the priority value of the plurality of PDs 140. If the first PD 142 has opted to continue operating in the normal mode, then the first PD 142 may indicate how much minimum power that it has to receive from the PSE 120 in order to operate in the normal mode or how much maximum power that the first PD 142 may expect to consume while operating in the normal mode. In some examples, the first PD 142 may indicate about 50 Watts, the PSE may reduce about 10 Watts from the first PD 142 and re-allocate 50 Watts to the first PD 142. Further, the PSE 120 may compare the reduced amount of power from the first PD 142 with the power deficit due to the swap event of the first PSU 132. For example, the PSE 120 may determine that the deficit is still about 50 Watts. In such examples, the PSE 120 may further negotiate with the second PD 144 among one or more PDs in the low priority PDs 140-1 based on the priority value of the plurality of PDs 140. If the second PD 142 has opted to continue operating in the normal mode, then the second PD 144 may indicate how much maximum amount of power that the second PD 144 is expected to consume while operating in the normal mode or how much minimum amount of power that the second PD 144 has to receive from the PSE 120 in order to operate in the normal mode. In some examples, the second PD 144 may indicate about 50 Watts, and the PSE 120 may reduce about 10 Watts from the second PD 144 and re-allocate 50 Watts to the second PD 144. Further, the PSE 120 may compare the reduced value of power from the second PD 144 with the remaining power deficit due to the swap event of the first PSU 132. For example, the PSE 120 may determine that the deficit is still about 40 Watts. In such examples, the PSE 120 may further negotiate with a third PD 146 among the one or more PDs in the high priority PDs 140-2. If the third PD 146 has opted to switch to the power-saving mode, then the third PD 146 may indicate how much power it has to receive in order to operate in the power-saving mode. In some examples, the third PD 146 may indicate about 50 Watts, then the PSE may reduce about 40 Watts from the third PD 146. In some examples, the PSE 120 may then communicate to the external computing system 110 about the reduced value of power for each of the first, second, and third PDs 142, 144, 146 respectively, and indicate the priority value of each of the first, second, and third PDs 142, 144, 146. The administrator 115 of the external computing system 110 may access the communication from the PSE 120 and reply with an approval to reallocate the reduced value of power to each of the first, second, and third PDs 142, 144, 146 respectively. Alternately, the administrator 115 may disapprove the reduced value of power to the third PD 146, since the third PD 146 has the high priority. Then, the PSE 120 may retain the initial value of allocated power to the third PD 146, and power down the first and second PDs 142, 144 respectively to offset the deficit of about 60 Watts due to the swap event of the first PSU 132 having the power supply rating of about 100 Watts.

While the PSE 120, the plurality of PDs 142, 144, 146, 146, the plurality of Ethernet cables 152, 154, 156, 158, the plurality of ports 122, 124, 126, 128, the plurality of PSUs 132, 134 are provided for illustrative purposes, persons of skill in the art will understand that no limitation on the number of PSEs, PDs, Ethernet cables, ports, or PSUs is intended thereby. Furthermore, the number of PSUs connected to a single PSE, the number of PDs connected to a single PSE, the number of PSEs connected to a single PD, and the number of Ethernet cables used to connect a PSE to a PD may all vary. For example, a single PD may be connected to a single PSE or multiple PSEs via more than one Ethernet cable (e.g., to receive more power via Ethernet than can be provided through a single port). Also, in some examples, PSEs and PDs may not necessarily be mutually exclusive. A PoE pass-through switch, for example, may concurrently act as both a PD (by receiving power through one Ethernet port) and a PSE (by providing power to another PD through another Ethernet port). In the case of a PoE pass-through switch, the PSEs that provide power to the PoE pass-through switch may serve the same role as the PSUs described herein.

Figure 2:
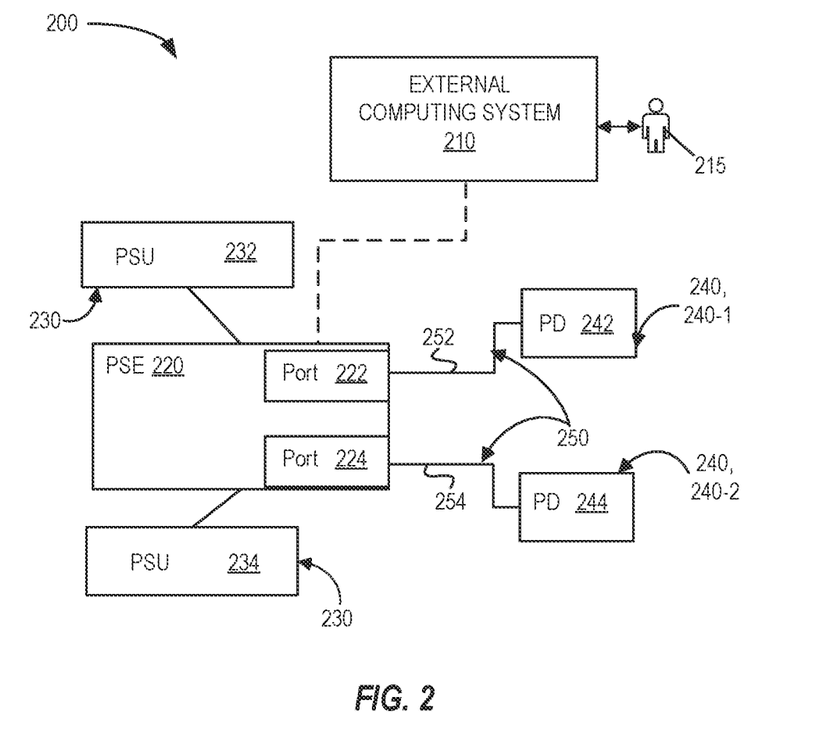
FIG. 2 illustrates a portion of another example computing environment having a power sourcing equipment, in accordance to another example implementation of the present disclosure.

FIG. 2 depicts a portion of another computing environment 200 according to another example of the present disclosure. The computing environment 200 is substantially similar to the computing environment 100, as discussed hereinabove in the example of FIG. 1, except for a number of priority ports in a power sourcing equipment (PSE) 220, and a number of powered devices (PDs) 240 connected to a respective port of the PSE 220. In some examples, the computing environment 200 includes the PSE 220, a plurality of power supply units (PSUs) 230, and the PDs 240.

In some examples, the PSE 220 may be a networking equipment (or device) which is responsible for transmitting power (e.g., Power over Ethernet (PoE)) and transceiving data to connected devices. For example, the PSE 220 may be a network switch, a multi-slot chassis containing multiple network switches, a router, or the like. The PSE 220 includes a plurality of ports 222, 224, for example, a plurality of Ethernet ports, where each Ethernet port may be compatible for receiving an Ethernet jack of a corresponding Ethernet cable of a plurality of Ethernet cables 250. In some examples, each of the plurality of PSUs 230 may be a power management device, which converts alternating current (AC) to low-voltage regulated direct current (DC) power for supplying to the PSE 220. Further, each of the plurality of PDs 240 may be electronic device, which is connected to the PSE 220 via the respective Ethernet cable of the plurality of Ethernet cables 250. In such examples, each of the plurality of PDs 240 may receive power from the PSE 120 and transceive data with the PSE 120 via the respective Ethernet cable of the plurality of Ethernet cables 250. In some non-limiting examples, the plurality of PDs 240 may be Voice over Internet Protocol (VoIP) phones, Light-Emitting Diode (LED) lights, Internet Protocol (IP) cameras, wireless access points (APs), Bluetooth Low-Energy (BLE) beacons, or the like.

As discussed hereinabove, persons of skill in the art will understand that the PSE 220 and each of the plurality of PDs 240 may include a processing resource and machine-readable medium (e.g., memory) to facilitate execution of the functionality described herein.

As shown in FIG. 2, the PSE 220 includes a first port 222 and a second port 224. Within the PSE 220, each of the plurality of ports 222, 224 may be assigned a priority value (e.g., a Spanning Tree Port Priority value). In some examples, the first port 222 is assigned a low priority value, and hence the first port 222 is categorized as a low priority port, and the second port 224 is assigned a high priority value, and hence the second port 224 is categorized as a high priority port. Further, as shown in FIG. 2, the plurality of PSUs 230 includes a first PSU 232 and a second PSU 234 both connected to the PSE 220 via cables for supplying power to the PSE 220. Similarly, as shown in FIG. 2, the plurality of PDs 240 includes a first PD 242 and a second PD 244. In some examples, the first PD 242 may be referred to as a low priority PD 240-1, whereas the second PD 244 may be referred to as a high priority PD 240-2. In such examples, the first PD 242 is connected to the first port 222 via a first Ethernet cable 252, and the second PD 244 is connected to the second port 224 via a second Ethernet cable 254. In some examples, each of the plurality of Ethernet cables 250 may be a Cat5 cable.

During operation, each of the plurality of PSUs 230 supplies power to the PSE 220 via the respective cable. Accordingly, the PSE 220 may transceive data, and transmit power to the plurality of PDs 240 via the plurality of Ethernet cables 250. In such examples, when each of the plurality of PDs 240 is initially connected to the PSE 220 by the respective Ethernet cable of the plurality of Ethernet cables 250, each of the plurality of PDs 240 and the PSE 220 may exchange a series of communications that conform to the Link Layer Discovery Protocol (LLDP). At times, the administrator 215 may send a command to the PSE 220 via the external computing system 210, about a swap event of at least one PSU, for example, a first PSU 232 among the plurality of PSUs 230.

Accordingly, the PSE 220 may determine that the swap event of the first PSU 232 is expected to cause powering down of one or more powered devices (PDs) among a plurality of PDs 240 connected to the PSE 220. For example, the PSE 220 may calculate a power supply rating of remaining PSUs among the plurality of PSUs 230, and compare it with the total power requirement of the plurality of PDs 240, to determine whether the swapping event of the first PSU 232 results in a power deficit to continue providing the initial value of power allocated to the plurality of PDs 240. For example, if the amount of power that the second PSU 234 (i.e., the remaining PSU) provides to the PSE 220 during the swap event of the first PSU 232 is sufficient for the PSE 220 to continue providing the initial amount of power allocated to each of the plurality of PDs 240, then the PSE 220 may not communicate and/or negotiate with any of the plurality of PDs 240 for reducing and/or reallocating the power. Alternatively, if the amount of power that the second PSU 234 provides to the PSE 220 during the swap event of the first PSU 232 is insufficient for the PSE 220 to continue providing the initial amount of power allocated to the plurality of PDs 240, then the PSE 220 sends a first network communication to the plurality of PDs 240 indicating that the swap event of the first PSU 232 is about to occur and negotiates with one or more PDs of the plurality of PDs 240 based on a priority of the plurality of PDs 240 for reducing and/or reallocating the power.

For example, the PSE 220 may first negotiate with one or more PDs among the plurality of PDs 240 based on a priority of the plurality of PDs 240 to reduce an amount of power from the one or more PDs among the plurality of PDs 240. Accordingly, the PSE 220 may try to avoid powering down of the one or more PDs among the plurality of PDs 240 during the swap event of the first PSU 232.

In one or more examples, before the swap event of the first PSU 232, the PSE 220 may request that the first PD 242 accept a lower amount of power than was initially allocated by sending a first network communication. The first PD 242 may opt to switch to a power-saving mode or continue operating in a normal mode, based on the request from the PSE 220, and may send a second network communication to the PSE 220. Accordingly, the PSE 220 can reduce the amount of power allocated to the first PD 242 to a reduced value of power. Further, the PSE 220 may determine whether an amount of power reduced from the first PD 242 is sufficient to offset the deficit of the power due the swap event of the first PSU 232.

In some examples, if the PSE 220 determines that the amount of power reduced from the first PD 242 is sufficient to offset the deficit of the power due to the swap event of the first PSU 232, then the PSE 220 may not negotiate with any other PDs among the plurality of PDs 240. Further, the PSE 220 may reallocate and provide the reduced value of power to the first PD 242, and communicate to the external computing system 210 to initiate the swap event of the first PSU 232.

In some other examples, if the PSE 220 determines that the amount of power reduced from the first PD 242 is insufficient to offset the deficit of the power due to the swap event of the first PSU 232, then the PSE 220 may further negotiate with the second PD 244 (i.e., a high priority PD, since there are no more low priority PDs) to accept the lower amount of power than was initially allocated to the second PD 244. If the second PD 244 has opted to operate in the power-saving mode based on the request from the PSE 220, then the PSE 220 can reduce the amount of power allocated to the second PD 244 to the reduced value of power. However, before the PSE 220 allocates the reduced value of power to the second PD 244 (i.e., high priority PD), the PSE 220 may communicate to the external computing system 210 about the reduced value of power for each of the first PD 242 and the second PD 244, and also indicate the priority value of each of the first PD 242 and the second PD 244. The administrator 215 of the external computing system 210 may access the communication from the PSE 220, and reply with an approval to reallocate the reduced value of power to each of the first PD 242 and the second PD 244. Alternately, the administrator 215 may disapprove the reduced value of power to the second PD 246 based on its high priority. Then, the PSE 220 may retain the initial value of allocated power to the second PD 246, and power down the first PD 242 to offset the power deficit due to the swap event of the first PSU 232.

Figure 3:
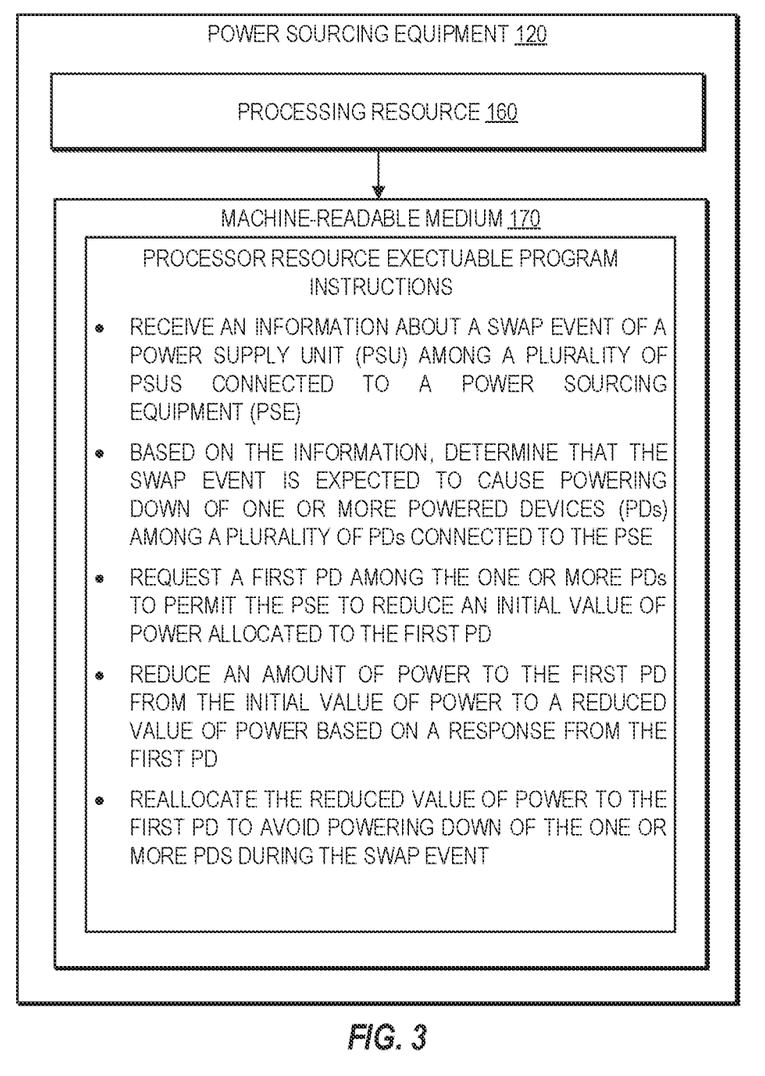
FIG. 3 is a block diagram depicting a power sourcing equipment having a processing resource operably coupled to a machine-readable medium storing executable program instructions, in accordance to an example implementation of the present disclosure.

FIG. 3 depicts a block diagram of a PSE 120 including a processing resource 160 and a machine-readable medium 170 storing executable program instructions. It should be noted herein that the PSE 120 referred to in FIG. 3 is same as the PSE 120 that is described in FIG. 1. In some examples, the processing resource 160 is operably coupled to the machine-readable medium 170. The processing resource 160 may be a physical processor. In some examples, the physical processor may be a microprocessor suitable for performing the functionality described in relation to FIG. 1. In some examples, the machine-readable medium 170 is non-transitory and is alternatively referred to as a non-transitory machine-readable medium. The processing resource 160 executes one or more program instructions (e.g., processing resource executable program instructions) to perform one or more functions described in FIG. 1.

In some examples, the processing resource 160 may execute program instructions for receiving information about a swap event of a power supply unit (PSU) among a plurality of PSUs, as discussed in the example of FIG. 1. In one or more examples, the PSE is communicatively coupled to plurality of PSUs via cables and the plurality of PDs via a plurality of Ethernet cables. In some examples, the plurality of PDs may include one or more high priority PDs and one or more low priority PDs (e.g., spanning Tree Port Priority value).

The processing resource 160 may further execute program instructions for determining based on the information that the swap event is expected to cause powering down of one or more powered devices (PDs) among a plurality of PDs connected to the PSE, as discussed in the example of FIG. 1. For example, the PSE may calculate a power supply rating of remaining PSUs among the plurality of PSUs and compare with the total power requirement of the plurality of PDs to determine whether the swapping event of the PSU results in a power deficit to continue providing the initial value of power allocated to the plurality of PDs.

Further, the processing resource 160 may execute the one or more program instructions for requesting a first PD among the one or more PDs based on the priority of the plurality of PDs, to permit the PSE to reduce an initial value of power allocated to the first PD, as discussed in the example of FIG. 1. In some examples, the PSE 120 may send a first network communication to the first PD indicating the swap event of the PSU. For example, the first network communication may include a bit that indicates the swap event. In one or more examples, the PSE 120 may initially choose one or more PDs having a first priority value (e.g., a low priority value) for sending the first network communication, and request to reduce the initial value of power from those low priority PDs. Further, the PSE 120 may optionally choose one or more PDs having a second priority value (e.g., a high priority value) for sending the first network communication, and request to reduce the initial value of power from those high priority PDs.

The processing resource 160 may further execute the one or more program instructions for reducing an amount of power from the initial value of power to a reduced value of power based on a response from the first PD, as discussed in the example of FIG. 1. In some examples, the first PD may send a second network communication in response to the request from the first network communication from the PSE 120. In some examples, the second network communication may include one or more bits that indicate whether the first PD has opted to switch to a power-saving mode, and a plurality of bits that indicates how much power the first PD has to receive in order to operate in the power-saving mode. In some other examples, the second network communication may include one or more bits that indicate the first PD has opted to continue operating in a normal mode, and a plurality of bits that indicate a maximum amount of power that the first PD is expected to consume while operating in the normal mode or how much minimum amount of power that the first PD has to receive from the PSE 120 to operate in the normal mode. Accordingly, the PSE 120 may reduce the amount of power to the first PD based on a response from the first PD.

Further, the processing resource 160 may execute the one or more program instructions for reallocating the reduced value of power to the first PD to avoid powering down the one or more PDs during the swap event, as discussed in the example of FIG. 1. In such examples, the processing resource 160 may execute the one or more program instructions to further determine if the reduced power from the first PSU is sufficient to offset the power deficit due to the swap event of the PSU. If the reduced power is sufficient to offset the power deficit, then the processing resource 160 may execute the one or more program instructions to communicate an external computing system to initiate the swap event and provide the reduced value of power to the first PD.

Figure 4:
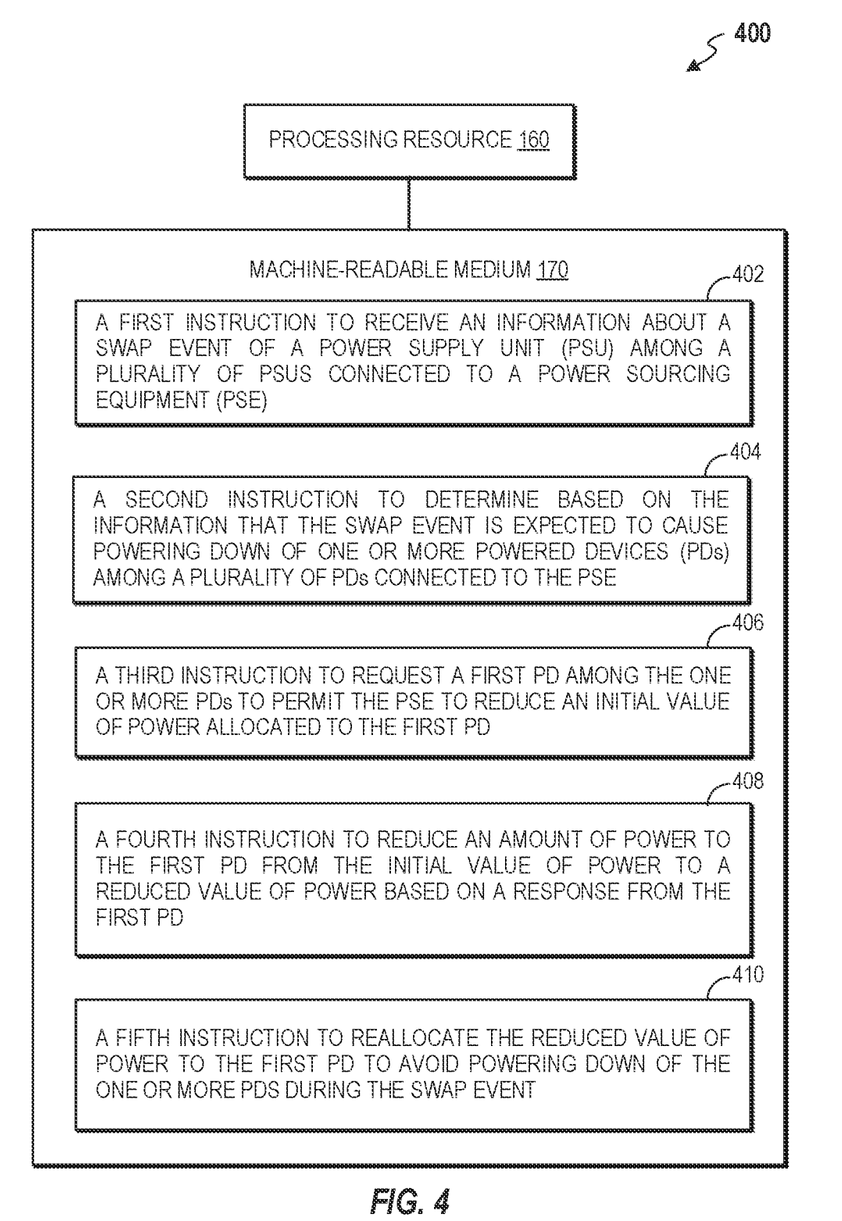
FIG. 4 is a block diagram depicting a processing resource and a machine-readable medium encoded with example instructions executable by a power sourcing equipment for reallocating power to one or more powered devices before a swap event of a power supply unit, in accordance to an example implementation of the present disclosure.
Figure 5:
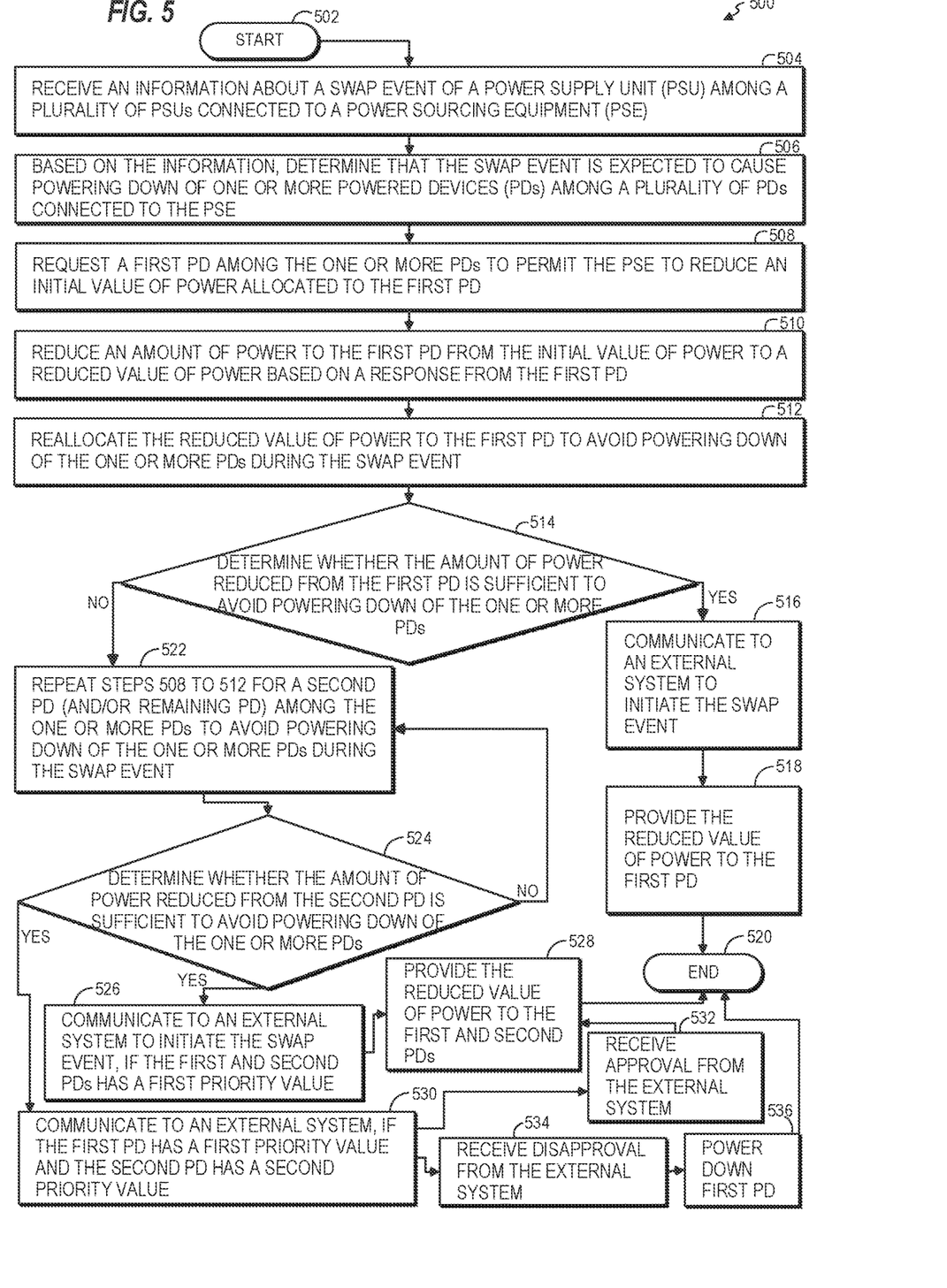
FIG. 5 is a flow diagram depicting a method of reallocating power to one or more powered devices before a swap event of a power supply unit, in accordance to an example implementation of the present disclosure.

FIG. 4 depicts a block diagram 400 depicting a processing resource 160 and a machine-readable medium 170 encoded with example instructions executable by a power sourcing equipment (PSE) for reallocating power to one or more powered devices (PDs) before a swap event of a power supply unit (PSU). It should be noted herein that the PSE referred to in FIG. 4 may be the same or similar to PSE 120 described in FIGS. 1 and 3. The machine-readable medium 170 is non-transitory and is alternatively referred to as a non-transitory machine-readable medium. In some examples, the machine-readable medium 170 may be accessed by the processing resource 160. In some examples, the machine-readable medium 170 stores the program instructions corresponding to functionality of the PSE, as discussed in FIGS. 1 and 3. The machine-readable medium 170 may be encoded, for example, with a first instruction 402, a second instruction 404, a third instruction 406, a fourth instruction 408, and a fifth instruction 410.

The first instruction 402, when executed by the processing resource 160 may implement aspects of receiving an information about a swap event of a PSU among a plurality of PSUs. In one or more examples, the PSE is communicatively coupled to the plurality of PSUs via cables and the plurality of PDs via a plurality of Ethernet cables. The step of receiving the information about the swap event is described in detail in FIG. 1.

The second instruction 404, when executed by the processing resource 160 may implement aspects of determining, based on the information that the swap event is expected to cause powering down of one or more PDs among a plurality of PDs connected to the PSE. The step of determining whether the swap event is expected to cause powering down of the one or more PDs among the plurality of PDs is described in detail in FIG. 1.

The third instruction 406 when executed by the processing resource 160 may implement aspects of requesting a first PD among the one or more PDs to permit the PSE to reduce an initial value of power allocated to the first PD. In one or more examples, the PSE may choose to request one or more first priority PDs, and optionally followed by one or more second priority PDs to reduce the initial value of power allocated to the respective PDs. The step of requesting the one or more PDs are described in detail in FIG. 1.

The fourth instruction 408, when executed by the processing resource 160 may implement aspects of reducing an amount of power from the initial value of power to a reduced value of power based on a response from the first PD. In some examples, the first PD may choose to operate in a power-saving mode or a normal mode, and accordingly, the first PD may communicate to the PSE about the power requirement to operate in the corresponding mode. Accordingly, the PSE may reduce the amount of power from the first PD. The step of reducing the amount of power from the first PD is described in detail in FIG. 1.

The fifth instruction 410, when executed by the processing resource 160 may implement aspects of reallocating the reduced value of power to the first PD to avoid powering down of the one or more PDs during the swap event. In some examples, the processing resource 160 may be configured to further determine if the reduced power from the first PD is sufficient to offset the power deficit due to the swap event of the PSU. If the reduced power is sufficient to offset the power deficit, then the processing resource may be configured to communicate to an external computing system to initiate the swap event and provide the reduced value of power to the first PD. The step of performing the reallocating the reduced value of power to the first PD is described in detail in FIG. 1.

FIG. 5 depicts a flow diagram depicting a method 500 of reallocating power to one or more powered devices (PDs) before a swap event of a power supply unit (PSU). It should be noted herein that the method 500 is described in conjunction with FIG. 1. In one or more examples, a plurality of steps discussed herein in the method 500 is performed by a power sourcing equipment (PSE).

The method 500 starts at block 502 and continues to block 504. At block 504, the method 500 includes receiving an information about a swap event of a power supply unit (PSU), for example, a first PSU among a plurality of PSUs. In one or more examples, an administrator may send a command to the PSE via the external computing system, about the swap event of the first PSU. In one or more examples, the swap event may be part of a periodic maintenance or a service event of the first PSU to avoid the possible failure of the first PSU due to prolonged usage over a period of time. In some examples, each of the plurality of PSUs may have a power supply rating, which is indicative of the power that the corresponding PSU is capable of supplying to the PSE. The method 500 continues to block 506.

At block 506, the method 500 includes based on the information, determining that the swap event is expected to cause powering down of one or more powered devices (PDs) among a plurality of PDs based on a priority of the plurality of PDs, as described in FIG. 1. In some examples, the PSE is connected to the plurality of PSUs via cables and to a plurality of PDs via a plurality of Ethernet cables. The method 500 continues to block 508.

At block 508, the method 500 includes requesting the first PD among the one or more PDs to permit the PSE to reduce an initial value of power allocated to the first PD, as described in FIG. 1. In one or more examples, the PSE may choose the one or more PDs having a first priority (or low priority) to request for reducing the initial value of the power allocated to the first PD. In such examples, the PSE may send a first network communication to the selected PD, for example, the first PD among the one or more PDs to reduce the initial value of power due to the swap event of the first PSU. In some examples, the first PD may have a first priority value (or the low priority). The method 500 continues to block 510.

At block 510, the method 500 includes reducing an amount of power from the initial value of power to a reduced value of power based on a response from the first PD, as described in FIG. 1. In some examples, upon receiving the first network communication from the PSE requesting for reducing the initial value of power, the first PD may opt to operate in a power-saving mode or a normal mode. Accordingly, the first PD may send a second network communication to the PSE to indicate its power requirement to operate in either the power-saving mode or the normal mode. Accordingly, the PSE may receive the second network communication from the first PD, and may reduce the amount of power to the first PD in accordance with the option selected by the first PD and the associated power requirement of the first PD. The method 500 continues to block 512.

At block 512, the method 500 includes reallocating the reduced value of power to the first PD to avoid powering down of the one or more PDs during the swap event, as described in FIG. 1. The method 500 continues to block 514. At block 514, the method 500 includes determining if the amount of power reduced from the first PD is sufficient to avoid powering down of the one or more PDs. In other words, the PSE may determine if the amount of power reduced from the first PD is sufficient to offset the power deficit due to the swap event of the first PSU. Accordingly, if the PSE determines that the amount of power reduced from the first PD is sufficient to offset the power deficit due to the swap event of the first PSU i.e., "yes" at block 514, the method 500 continues to block 516.

At block 516, the method 500 includes communicating to an external computing system to initiate the swap event. In some examples, the PSE may additionally provide details about the first PD, and its priority value to the external computing system. The method 500 continues to block 518.

At block 518, the method 500 includes providing the reduced value of power to the first PSU so as to avoid powering down of the one or more PDs during the swap event. In one or more examples, the PSE may initiate a pre-determined time period for completing the swap event to the external computing system. In some examples, if the swap event is not completed within the pre-determined time period, then the PSE may restore the initial value of power allocated to the first PD among one or more PDs. It may be noted that the term "not completed" may refer to non-initiating of the swap event from the administrator within the pre-determined time period. In such examples, the PSE may inform the administrator, that it would restore the initial value of power allocated to the first PD among one or more PDs, and request the administrator to reinitiate the process of sending the information about the swap event to the PSE. In some other examples, if the swap event is completed within the pre-determined time period, then the PSE may evaluate the power supply rating of a swapped PSU with that of an old power supply rating of the first PSU. Accordingly, if the PSE determines that the swapped PSU had the power supply rating greater than or equal to the old power supply rating of the first PSU, then the PSE may allocate the initial value of power to the first PSU after the swap event. However, if the PSE determines that the swapped PSU has the power supply rating lower than old power supply rating of the first PSU, then the PSE may communicate to the external computing system about powering down the first PD based on the priority, for accommodating the power supply rating of the swapped PSU. In other words, if the PSE determines that the swapped PSU has the lower power supply rating than the first PSU, then the PSE communicates to the external computing system about powering down the one or more PDs based on the priority for accommodating the power supply rating of the swapped PSU. The method 500 ends at block 520. In some examples, the term "accommodating" the power supply rating of the swapped PSU may refer to using the power provided from the swapped PSU to supply PoE to remaining PDs (i.e., non-powered down PDs) among the plurality of PDs.

Referring back to the block 514, if the PSE determines that the amount of power reduced from the first PD is insufficient to offset the power deficit due to the swap event of the first PSU i.e., "no" at block 514, the method 500 continues to block 522.

At block 522, the method 500 includes repeating steps related to blocks 508 to 512 described hereinabove (or steps iii to v as recited in claim 1 of the present application) for a second PD among the one or more PDs to avoid powering down of the one or more PDs during the swap event. The method 500 continues to block 524. In some examples, the second PD has the first priority (or the low priority), as in the case of first PD. However, in some other examples, the second PD may have a second priority (or a high priority).

At block 524, the method 500 includes determining if the amount of power reduced from the second PD is sufficient to avoid powering down of the one or more PDs. In other words, the PSE may determine if the amount of power reduced from the second PD is sufficient to offset the power deficit due to the swap event of the first PSU. Accordingly, if the PSE determines that the amount of power reduced from the second PD is sufficient to offset the power deficit due to the swap event of the first PSU i.e., "yes" at block 524, the method 500 continues to block 526, only if the second PD has been assigned the first priority (i.e., low priority value).

At block 526, the method 500 includes communicating to the external computing system to initiate the swap event of the first PSU. It may be noted herein, that the PSE may request the external computing system to initiate the swap event, if it determines that each of the first and second PDs has the first priority value (or a low priority value). In such examples, the method 500 continues to block 528.

At block 528, the method 500 includes providing the reduced value of power to the second PD so as to avoid powering down of the one or more PDs during the swap event of the first PSU. The method 500 ends at block 520.

Referring back to the block 524, if the PSE determines that the amount of power reduced from the second PD is still insufficient to offset the power deficit due to the swap event of the first PSU i.e., "no" at block 524, the method 500 returns to block 522, where the PSE may repeat the steps related to blocks 508 to 512 described hereinabove (or steps iii to v as recited in claim 1 of present application) for a remaining PD among the one or more PDs to avoid powering down of the one or more PDs during the swap event of the first PSU.

Again, referring back to the block 524, if the PSE determines that the amount of power reduced from the second PD is sufficient to offset the power deficit due to the swap event of the first PSU i.e., "yes" at block 524, the method 500 continues to block 530, only if the second PD has been assigned the second priority value (i.e., a high priority value).

At block 530, the method 500 includes communicating to the external computing system that the first PD has the first priority value and the second PD has the second priority value. In some examples, if an administrator of the external computing system provides approval to the reallocation of the power to the first and second PDs, then the method 500 continues to block 532. At block 532, the method 500 includes receiving approval for reallocation of the power to the first and second PDs from an administrator via the external computing system. In such examples, the method 500 continues to block 528. As discussed hereinabove, at block 528, the method 500 includes providing the reduced value of power to the first and second PDs so as to avoid powering down of the one or more PDs during the swap event of the first PSU. The method 500 ends at block 520.

Referring back to block 530, the method 500 includes communicating to the external computing system that the first PD has the first priority value and the second PD has the second priority value. If the administrator of the external computing system provides disapproval to the reallocation of the power to the second PD, then the method 500 continues to block 534. At block 534, the method 500 includes receiving disapproval for reallocation of the power to the second PD from the administrator of the external computing system. In such examples, the method 500 continues to block 536. As discussed hereinabove, at block 534, the method 500 includes rejecting the reduced value of power to the second PD, since the second PD has the high priority value. The method 500 continues to block 536. At block 536, the method 500 includes communicating to the external computing system about restoring the initial value of power to the second PD and powering down the first PD, as per the command from the external computing system. The method 500 ends at block 520.

Various features as illustrated in the examples described herein may be implemented in a power sourcing equipment (PSE) may perform before an actual swap event of a power supply unit (PSU). For example, the PSE may perform re-negotiating, reduction, and reallocation of the power (PoE) to one or more powered devices (PDs) before the swap event, in order to avoid powering down of those PDs during the actual swap event, and also avoid a time consuming reboot cycle of those devices after the swap event. This will provide more flexibility to customers and less downtime for the PD as more ports will remain up during PSU swap. In other words, the PSE of the present disclosure may prevent downtime in industry or institution networks, which may be very costly. Further, the Type-Length-Value (TLV) added to the LLDP protocol introduces back and forth communication between the PSE and each of the plurality of PDs, and may be customized as a proprietary protocol or may be added to a standard protocol (e.g., IEEE). Further, the present disclosure may be implemented on a multi-slot chassis having multiple ports, as reshuffling of the initial power (PoE) allocated to the one or more PDs is more practical and effective.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
   i) receiving, by a power sourcing equipment (PSE), an information about a swap event of a power supply unit (PSU) among a plurality of PSUs connected to the PSE,
   ii) based on the information, determining, by the PSE, that the swap event is expected to cause powering down of one or more powered devices (PDs) among a plurality of PDs connected to the PSE;
   iii) requesting, by the PSE, a first PD among the one or more PDs to permit the PSE to reduce an initial value of power allocated to the first PD;
   iv) reducing, by the PSE, an amount of power to the first PD from the initial value of power to a reduced value of power based on a response from the first PD;
   v) reallocating, by the PSE, the reduced value of power to the first PD to avoid powering down of the one or more PDs during the swap event;
   vi) determining, by the PSE, whether the amount of power reduced from the first PD is sufficient to avoid powering down of the one or more PDs; and
   vii) in response to determining the amount of power reduced from the first PD is insufficient to avoid powering down of the one or more PDs, repeating, by the PSE, steps iii) to v) for a second PD among the one or more PDs to avoid powering down of the one or more PDs during the swap event.

2. The method of claim 1, further comprising:
   determining, by the PSE, whether the amount of power reduced from the second PD is sufficient to avoid powering down of the one or more PDs, wherein the first PD has a first priority value and the second PD has a second priority value;
   in response to determining the amount of power reduced from the second PD is sufficient to avoid powering down of the one or more PDs, communicating, by the PSE, to an external computing system that the second PD has the second priority value; and
   receiving, by the PSE, an approval from the external computing system before reallocating the reduced value of power to the second PD and providing the reduced value of power to the second PD.

3. The method of claim 1, further comprising:
   determining, by the PSE, whether the amount of power reduced from the second PD is sufficient to avoid powering down of the one or more PDs, wherein each of the first and second PDs has a first priority value;
   in response to determining the amount of power reduced from the second PD is sufficient to avoid powering down of the one or more PDs, communicating, by the PSE, to an external computing system to initiate the swap event; and
   providing, by the PSE, a corresponding reduced value of power to the first and second PDs.

4. The method of claim 1, further comprising:
   determining, by the PSE, whether the amount of power reduced from the first PD is sufficient to avoid powering down of the one or more PDs;
   in response to determining the amount of power reduced from the first PD is sufficient to avoid powering down of the one or more PDs, communicating, by the PSE, to an external computing system to initiate the swap event; and
   providing, by the PSE, the reduced value of power to the first PD.

5. The method of claim 1, further comprising:
   initiating, by the PSE, a pre-determined time period for completing the swap event;
   determining, by the PSE, whether the swap event is completed within the pre-determined time period; and
   in response to determining that the swap event is not completed within the pre-determined time period, restoring, by the PSE, the initial value of power allocated to each PD among the plurality of PDs.

6. The method of claim 1, further comprising:
   initiating, by the PSE, a pre-determined time period for completing the swap event;
   determining, by the PSE, whether the swap event is completed within the pre-determined time period;
   in response to determining that the swap event is completed within the pre-determined time period, determining, by the PSE, a power supply rating of a swapped PSU;
   determining, by the PSE, whether the swapped PSU has the power supply rating greater than or equal to an old power supply rating of the PSU; and
   in response to determining that the swapped PSU has the power supply rating lower than the old power supply rating of the PSU, communicating, by the PSE, to an external computing system about powering down the one or more PDs based on a priority of the plurality of PDs for accommodating the power supply rating of the swapped PSU.

7. The method of claim 1, wherein requesting the first PD comprises sending a first network communication, by the PSE, to the first PD indicating a swap status of the PSU among the plurality of PSUs, and wherein the first network communication comprises a bit that indicates the swap status of the PSU.

8. The method of claim 7, wherein reducing the amount of power to the first PD comprises receiving, by the PSE, a second network communication sent from the first PD in response to the first network communication, wherein the second network communication comprises one or more bits that indicate whether the first PD has opted to switch to a power-saving mode, and wherein the second network communication further comprises a plurality of bits that indicates how much power that the first PD has to receive in order to operate in the power-saving mode.

9. The method of claim 7, wherein reducing the amount of power to the first PD comprises receiving, by the PSE, a second network communication sent from the first PD in response to the first network communication, wherein the second network communication comprises one or more bits that indicate the first PD has opted to continue operating in a normal mode, and wherein the second network communication further comprises a plurality of bits that indicate a maximum amount of power that the first PD is expected to consume while operating in the normal mode.

10. A power sourcing equipment (PSE) comprising:
a non-transitory machine-readable medium that stores program instructions; and
a processing resource operably coupled to the non-transitory machine-readable medium, wherein the processing resource executes the program instructions to:
i) receive an information about a swap event of a power supply unit (PSU) among a plurality of PSUs connected to the PSE,
ii) based on the information, determine that the swap event is expected to cause powering down of one or more powered devices (PDs) among a plurality of PDs connected to the PSE;
iii) request a first PD among the one or more PDs to permit the PSE to reduce an initial value of power allocated to the first PD;
iv) reduce an amount of power to the first PD from the initial value of power to a reduced value of power based on a response from the first PD;
v) reallocate the reduced value of power to the first PD to avoid powering down of the one or more PDs during the swap event;
vi) determine whether the amount of power reduced from the first PD is sufficient to avoid powering down of the one or more PDs; and
vii) repeat steps of iii) to v) for a second PD among the one or more PDs to avoid powering down of the one or more PDs during the swap event, in response to determining the amount of power reduced from the first PD is insufficient to avoid powering down of the one or more PDs.

11. The PSE of claim 10, wherein the processing resource further executes the program instructions to:
determine whether the amount of power reduced from the second PD is sufficient to avoid powering down of the one or more PDs, wherein the first PD has a first priority value and the second PD has a second priority value;
communicate to an external computing system that the second PD has the second priority value, in response to determining the amount of power reduced from the second PD is sufficient to avoid powering down of the one or more PDs; and
receive an approval from the external computing system before reallocating the reduced value of power to the second PD and provide the reduced value of power to the second PD.

12. The PSE of claim 10, wherein the processing resource further executes the program instructions to:
determine whether the amount of power reduced from the second PD is sufficient to avoid powering down of the one or more PDs, wherein each of the first and second PDs has a first priority value;
communicate to an external computing system to initiate the swap event, in response to determining the amount of power reduced from the second PD is sufficient to avoid powering down of the one or more PDs; and
provide a corresponding reduced value of power to the first and second PDs.

13. The PSE of claim 10, wherein the processing resource further executes the program instructions to:
determine whether the amount of power reduced from the first PD is sufficient to avoid powering down of the one or more PDs;
communicate to an external computing system to initiate the swap event, in response to determining the amount of power reduced from the first PD is sufficient to avoid powering down of the one or more PDs; and
provide the reduced value of power to the first PD.

14. The PSE of claim 10, wherein the processing resource further executes the program instructions to:
initiate a pre-determined time period for completing the swap event;
determine whether the swap event is completed within the pre-determined time period; and
restore the initial value of power allocated to each PD among the plurality of PDs, in response to determining that the swap event is not completed within the pre-determined time period.

15. The PSE of claim 10, wherein the processing resource further executes the program instructions to:
initiate a pre-determined time period for completing the swap event;
determine whether the swap event is completed within the pre-determined time period;
determine a power supply rating of a swapped PSU, in response to determining that the swap event is completed within the pre-determined time period;
determine whether the swapped PSU has the power supply rating greater than or equal to an old power supply rating of the PSU; and
communicate to an external computing system about powering down the one or more PDs based on a priority of the plurality of PDs for accommodating the power supply rating of the swapped PSU, in response to determining that the swapped PSU has the power supply rating lower than the power supply rating of the PSU.

16. The PSE of claim 10, wherein the program instructions to request the first PD comprise instructions to send a first network communication to the first PD indicating a swap status of the PSU among the plurality of PSUs, wherein the first network communication comprises a bit that indicates the swap status of the PSU, and
wherein reducing the amount of power to the first PD comprises the processing resource to execute the program instructions to receive a second network communication sent from the first PD in response to the first network communication, wherein the second network communication comprises one or more bits that indicate whether the first PD has opted to switch to a power-saving mode, and wherein the second network communication further comprises a plurality of bits that indicates how much power that the first PD has to receive in order to operate in the power-saving mode.

17. The PSE of claim 10, wherein the program instructions to request the first PD comprise instructions to send a first network communication to the first PD indicating the swap event of the PSU, wherein the first network communication comprises a bit that indicates the swap event by specifying a swap status of the PSU, and
wherein the instructions to reduce the amount of power to the first PD comprise instructions to receive a second network communication sent from the first PD in response to the first network communication, wherein the second network communication comprises one or more bits that indicate the first PD has opted to continue operating in a normal mode, and wherein the second network communication further comprises a plurality of bits that indicate a maximum amount of power that the first PD is expected to consume while operating in the normal mode.

18. A non-transitory machine-readable medium that stores instructions executable by a power sourcing equipment (PSE), wherein instructions comprising:
- a first instruction to receive an information about a swap event of a power supply unit (PSU) among a plurality of PSUs connected to the PSE,
- a second instruction to determine based on the information, that the swap event is expected to cause powering down of one or more powered devices (PDs) among a plurality of PDs connected to the PSE;
- a third instruction to request a first PD among the one or more PDs to permit the PSE to reduce an initial value of power allocated to the first PD;
- a fourth instruction to reduce an amount of power to the first PD from the initial value of power to a reduced value of power based on a response from the first PD;
- a fifth instruction to reallocate the reduced value of power to the first PD to avoid powering down of the one or more PDs during the swap event;
- a sixth instruction to determine whether the amount of power reduced from the first PD is sufficient to avoid powering down of the one or more PDs; and
- a seventh instruction to repeat from the third instruction to the fifth instruction for a second PD among the one or more PDs to avoid powering down of the one or more PDs during the swap event, in response to determining the amount of power reduced from the first PD is insufficient to avoid powering down of the one or more PDs.

19. The non-transitory machine-readable medium of claim 18, wherein the instructions further comprise:
- an eighth instruction to determine whether the amount of power reduced from the second PD is sufficient to avoid powering down of the one or more PDs, wherein the first PD has a first priority value and the second PD has a second priority value;
- a ninth instruction to communicate to an external computing system that the second PD has the second priority value, in response to determining the amount of power reduced from the second PD is sufficient to avoid powering down of the one or more PDs; and
- a tenth instruction to receive an approval from the external computing system before reallocating the reduced value of power to the second PD and provide the reduced value of power to the second PD.

20. The non-transitory machine-readable medium of claim 18, wherein the instructions further comprise:
- an eighth instruction to determine whether the amount of power reduced from the second PD is sufficient to avoid powering down of the one or more PDs, wherein each of the first and second PDs has a first priority value;
- a ninth instruction to communicate to an external computing system to initiate the swap event, in response to determining the amount of power reduced from the second PD is sufficient to avoid powering down of the one or more PDs; and
- a tenth instruction to provide a corresponding reduced value of power to the first and second PDs.

\* \* \* \* \*